Nov. 28, 1950 W. E. WHIDDEN 2,532,133

VOLUME CONTROL FOR TELEPHONE RINGERS

Filed April 9, 1949 2 Sheets-Sheet 1

INVENTOR
W. E. WHIDDEN
BY A. F. Kane
ATTORNEY

Nov. 28, 1950 W. E. WHIDDEN 2,532,133

VOLUME CONTROL FOR TELEPHONE RINGERS

Filed April 9, 1949 2 Sheets-Sheet 2

INVENTOR
W.E. WHIDDEN
BY A. F. Kane
ATTORNEY

Patented Nov. 28, 1950 2,532,133

UNITED STATES PATENT OFFICE 2,532,133

VOLUME CONTROL FOR TELEPHONE RINGERS

William E. Whidden, Chatham, N. J., assignor to Bell Telephone Laboratories, Incorporated, New York, N. Y., a corporation of New York Application April 9, 1949, Serial No. 86,547

8 Claims. (Cl. 177—7)

This invention relates to audible signaling devices of the percussion type and particularly to improvements in sound regulators for telephone ringers.

The audible signaling device commonly used at telephone subscribers' stations is known generally as a telephone ringer. This device comprises an electromagnetically-controlled, vibratable clapper rod which supports a clapper ball between two spaced gongs so that as the rod is vibrated the clapper ball strikes the gongs alternately to produce a sound signal. In practice, each gong is struck by the clapper ball on the overthrow of the clapper rod. That is, after the rod reaches its maximum swing, in either direction, as determined by the amplitude of the stroke of the magnet armature to which the rod is staked or otherwise fixed, the resiliency of the rod and the inertia of the clapper ball permit the clapper ball to continue in the direction of the gong and to strike the gong. This "whip" action, or overthrow of the rod which insures instantaneous contact of the clapper ball with the gong by effecting its immediate rebound from the gong contributes to the production of a clear, resonant and undamped sound signal.

Attempts have been made heretofore to provide the telephone subscriber with a ringer, the sound output of which could be progressively muffled or otherwise adjusted to satisfy the desires of the subscriber. In general, efforts in this direction have resulted in signaling devices in which the sound level could be adjusted between upper and lower limits only at the expense of clarity of tone unless the adjustment was made by an experienced maintenance man. In my patent No. 2,468,474 of April 26, 1949, there is disclosed a sound regulator for telephone ringers which is subscriber-controlled and which insures a uniform, high quality tone regardless of the sound level at which the ringer may be adjusted to operate. In the regulator of that patent provision is made for effecting the simultaneous adjustment of the stroke of the clapper rod and of the spacing between the gongs thereby insuring the striking of the gongs by the clapper ball on the overthrow of the clapper rod for rod strokes of any and all amplitudes, and precluding the possibility of the clapper acting to damp the gong vibrations even at small amplitude strokes of the clapper rod.

It is the object of this invention to provide an improved sound regulator of the type disclosed in the above-identified patent, which insures a uniform high quality, undamped tone signal irrespective of the sound level at which the signal is produced.

This object is attained in accordance with a feature of the invention by eccentrically mounting one of a pair of ringer gongs on a manually operable, rotatable gong mount having a peripheral camming edge which serves as a variably positionable stop for the ringer armature to which the clapper rod is fixed. More particularly, a stop rod staked at one end to the ringer armature has its free end located in spaced relation to a particularly contoured edge of the rotatable gong mount so that as the mount is rotated in either direction to decrease or increase the spacing between the gongs the spacing between the stop rod and the edge of the gong mount is correspondingly varied to correspondingly regulate the stroke of the ringer armature. An ancillary feature of the invention contemplates regulating the extent of clapper overthrow in a telephone ringer in accordance with the adjustment of the gong spacing and of the armature stroke.

Resonators are frequently employed with the gongs of a telephone ringer whereby the fundamental tone of the gongs is reinforced and improved in quality and distinctiveness. One form of resonator, disclosed in E. R. Morton Patent 2,216,956 of October 8, 1940, comprises a metallic, substantially cup-shaped element having two diametrically opposed triangular openings of predetermined dimensions located near the opening or rim thereof. Maximum tone amplification is obtained when the ringer clapper strikes the gong at a point immediately adjacent, or opposite to a resonator opening, it being understood that in practice the resonator and its associated gong are disposed in nested relation with the gong located exteriorly of the resonator. In accordance with another feature of the present invention the rotatable gong mount provides means for fixedly mounting a resonator thereon within a corresponding gong so that, as the gong mount is rotated the position of the resonator openings relative to the clapper ball of the ringer is varied to correspondingly contribute to the over-all sound adjustment.

A further feature of the invention contemplates an adjustment setting of the sound regulator which results in the silencing of the ringer. More particularly, while the normal settings of the sound regulator provide sound regulation between upper and lower audible limits, the contour of the edge of the eccentric gong mounting is such that when the mounting is rotated one step beyond the lower sound setting the edge of the mounting engages the armature stop rod to preclude any operation of the armature and therefore to prevent any engagement of the clapper with the ringer gongs. Usually such adjustment of the ringer would be made in the field by a maintenance man. Accordingly while the subscriber may adjust the sound level from the exterior of the telephone set, the silencing adjustment must be made from within the set. It is obvious however, that the silencing adjustment could be made accessible to the subscriber, if desirable, without departing from the spirit of the present invention. In fact, the setting by the installer permits the subscriber the option of the full volume range including complete silencing at his will.

These and other features of the invention will be readily understood from the following detailed description when read with reference to the accompanying drawings in which.

Figures 1, 6:
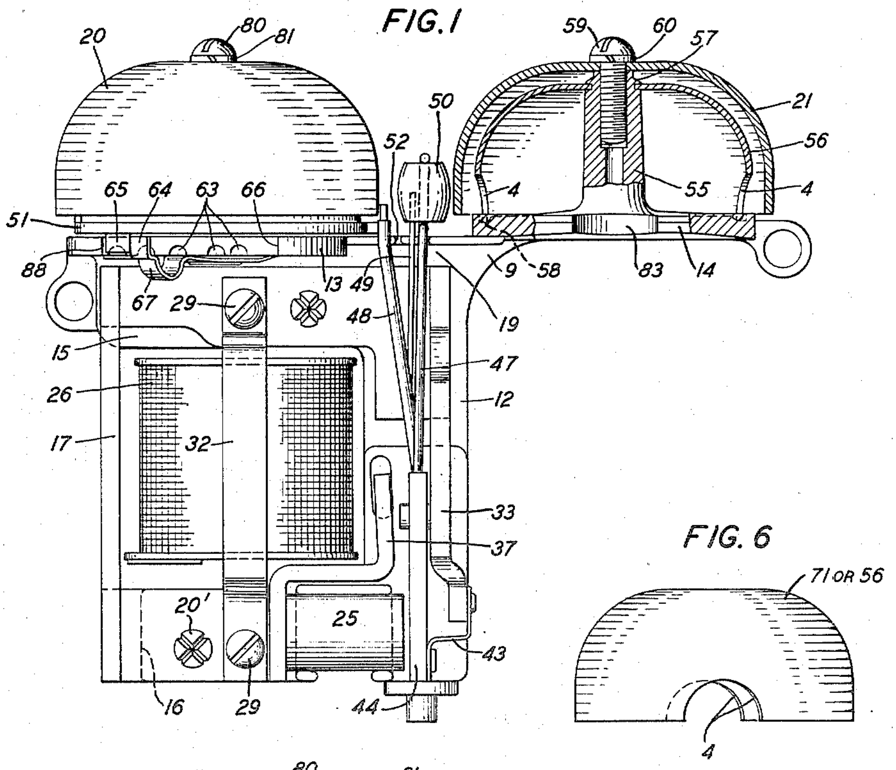
Fig. 1 is a front plan view of a telephone ringer embodying the sound regulator of this invention.
Fig. 6 is a view of a resonator such as is associated with each ringer gong.

The ringer disclosed in the drawings comprises an irregularly configured frame which may be die cast of aluminum, or of any other suitable material. The frame is essentially a spider-like, integral formation consisting of a central post 12, two substantially parallelly disposed arms 15 and 16 projecting at right angles from the upper and lower ends, respectively, of the post 12, and a pair of shelf-like integral projecting sections 13 and 14 which are generally circular, or disc-like in configuration. The sections 13 and 14 are joined by an interconnecting frame portion 19 which, actually, constitutes the upper extremity of the post 12. As clearly indicated in Fig. 1, the shelf-like sections 13 and 14 of the frame occupy different horizontal planes. The frame curvature indicated at 9 (Fig. 1) is representative of a reinforcing webbing extending from the underside of the projection 14 to the centrally disposed post 12.

A unit-type pole-piece 17 is fixed to the frame arms 15 and 16 by means of screws 20. This element, which is irregularly formed, is clearly shown in Fig. 4 of the drawings of a concurrently copending application, Serial No. 86,518, filed April 9, 1949. A coil 26 is mounted on a laminated core structure 27 which, together with a silicon steel shunt 32, is secured to the frame pieces 15 and 16 by screws 29. The extremities of the unit pole-piece 17 which are designated 33 and 37 in Fig. 1 define an air-gap in which an armature 44 is adapted to vibrate under the joint control of the magnet coil 26 and a small cylindrical magnet 25. The armature 44 is mounted on the lower end of pole-piece 33 by means of a spring hinge 43.

The elements thus far described constitute essentially the magnet and electrical elements of the ringer and form no part of the present invention. They are more fully described in the above-mentioned copending application.

The armature 44 has staked or otherwise secured thereto a phosphor bronze clapper rod 47, a brass or steel wire stop rod 48 and a bronze wire spring 49 all of which project generally upward from the upper edge of the armature, viewing Fig. 1. The clapper rod 47 has its outer end suitably configured to provide a seat, or bearing upon which a brass clapper ball 50 is floatingly mounted. This clapper assembly has been made the subject-matter of a copending application, Serial No. 788,344, filed November 28, 1947.

The stop rod 48 is inclined away from normal in the direction of the coil 26 throughout the greater portion of its length and is bent back to normal for a short length at its outer end. This latter portion of the stop rod cooperates with the peripheral edge of a rotatable eccentric, or gong mounting 51 in controlling the stroke of the clapper rod as will be described more fully hereinafter.

The bronze wire spring 49 is an armature biasing spring, the upper end of which is adapted to be manually set in any of three notches 52 which are formed in a forwardly projecting ledge of the frame. The armature bias may be adjusted by setting the upper end of spring 49 selectively in the notches 52.

The shelf- or ledge-like section 14 of the frame is provided with a substantially centrally located integral post 55 which serves to mount the gong 21 and its associated resonator 56. The resonator is cup-, or bell-shaped and is provided with a circular aperture at its apex, the edge of which rests upon a shoulder 57 formed on the post 55 near its upper end. A circular ledge 58 is formed on the frame section 14 to effect a correspondingly shaped shoulder with which the resonator rim makes tensioned engagement. The resonator 56 is staked on the shoulder of the gong post 55 and is prevented from turning relative to the gong mount. Further reference to the resonator construction will be made hereinafter. The gong 21 is clamped to the top of the post 55 by means of a screw 59 which passes through an eccentrically located aperture in the gong, through a lock washer 60 into a suitably tapped hole in the post 55.

Figure 2:
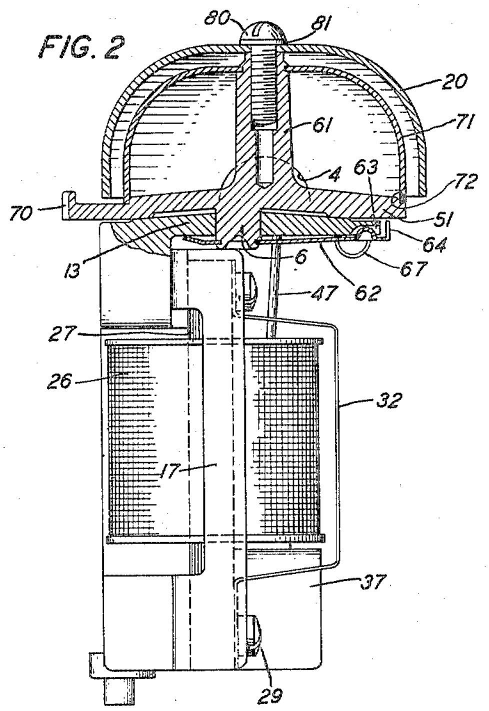
Fig. 2 is a side view of the ringer shown in Fig. 1. In this view the movable gong mounting and its associated gong and resonator are shown in section.

A gong 20, similar in shape to the gong 21 but which is adjustable relative thereto is centrally mounted on the rotatable gong mounting 51. Gong mounting 51 comprises a disc-like element or eccentric, having a generally circular configuration, from one side of which projects a stub shaft 6 (Fig. 2) which is adapted for rotation in a suitable aperture in the frame section 13. A post 61 projects from the other side of the frame section 13 and has its longitudinal axis offset with respect to the longitudinal axis of the shaft 6 so that as the gong mounting is rotated on the stub shaft 6 the spacing between gongs 20 and 21 is increased or decreased depending upon the direction in which the mounting is rotated between two limiting stops. As the gong mounting 51 is rotated, the spacing between the edge thereof and the upper end of the stop rod 48 is also varied so that by manipulation of the gong mounting the gong spacing and the stroke of the clapper rod 47 may be adjusted simultaneously to regulate the level of the sound signal emitted by the ringer.

The gong 20 is mounted on the post 61 in telescopic relation to its associated resonator 71 and is secured to the post by means of a screw 80 which passes through an aperture in the gong apex, through a lock washer 81 into a suitably tapped hole in the post. The resonator 71 is provided with a small opening at its apex through which the upper end of the post 61 protrudes. At this area the resonator is fixed to the post so as to be movable with the gong mounting. The gong mounting 51 is provided with a circular ledge which effects a shoulder 72 with which the rim of the resonator 71 makes tensioned contact.

As indicated in Fig. 6, the resonators 56 and 71 for the fixed and movable gongs respectively are identical and each is provided with two diametrically opposed semicircular openings 4 which serve a well-known purpose. Normally, that is, when the ringer is adjusted for maximum sound output the resonator openings 4 and the clapper ball 50 lie along the same line. It will be observed that since the resonator 71 and gong 20 move as a unit when the gong mounting 51 is rotated, the location of the resonator openings with respect to the gong area which the clapper ball 50 strikes when vibrated is altered. As this misalignment of the resonator openings with the clapper ball is increased the amplifying effect of the resonator is diminished. The semicircular opening 83 in the main frame behind the fixed gong 21 is a part of the resonating system of that gong. The resonators amplify or magnify the energy of the fundamental frequencies of the gongs one hundred fold (20 decibels). The fundamental frequencies of the gongs are harmoniously related, the frequency ratio being five-fourths or a major third.

The range in total sound energy from maximum to minimum sound positions is considerable, the energy decreasing forty-fold between these limits. At the minimum sound position the clapper ball strikes the movable gong at a point well displaced from the resonator opening and the efficiency of the resonator is somewhat reduced thus contributing in some degree to this wide volume range.

To facilitate the sound regulation of the ringer by the telephone subscriber the gong mounting 51 is provided with a projecting sector 70 which protrudes through, or is accessible by way of a suitable slot in the base of the telephone set. This portion of the mounting is provided with a serrated, or knurled edge to simplify the movement of the mounting by the subscriber.

The underside of the frame section 13 is provided with a series of notches 63 which accommodate the outer end of a detent 62 (Fig. 2) and serve in latching the gong mounting in any of its several settings, it being observed that the detent is mounted on the stub shaft 6 for rotation therewith. The detent 62 is also provided with an extension 64 which, after the gong mounting has been rotated through a predetermined arc, engages a stop 66 which is formed as an integral projection on the rim of the frame section 13. The detent component 67 and its extension 64 are prevented from bending or twisting due to excessively applied forces on the finger wheel by the simultaneous engagement of the integral lug 65 located on the underside of the rotatable gong mounting 54 with the extension 64. An added adjustment of the gong mounting may be obtained by pulling the detent component 67 away from the frame section 13 until the extension 64 clears the stop 66. This permits the rotatable mounting 51 to be moved one extra step until it reaches the limit of its rotation by the engagement of the lug 65 with the frame stop 66. In this position of the movable gong, as will be described more fully hereinafter, the ringer is completely silenced. The limit of rotation of the mounting 51 in the direction of maximum volume is set by the engagement of lug 65 with stop 88.

Figure 3:
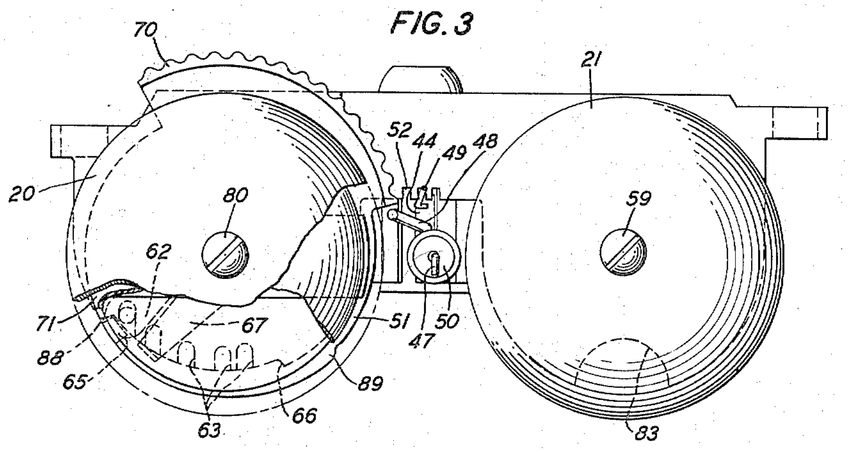
Figs. 3, 4 and 5 are top plan views looking down on the ringer gongs and illustrate three different settings of the adjustable gong mounting and its associated gong.
Figure 4:
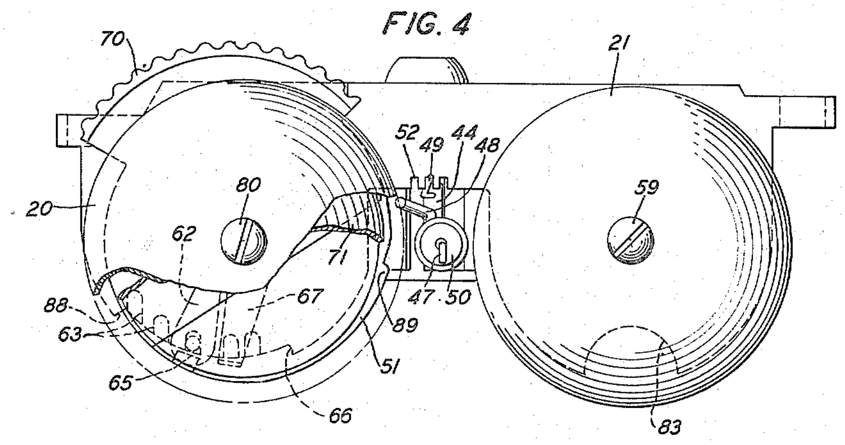
Figure 5:
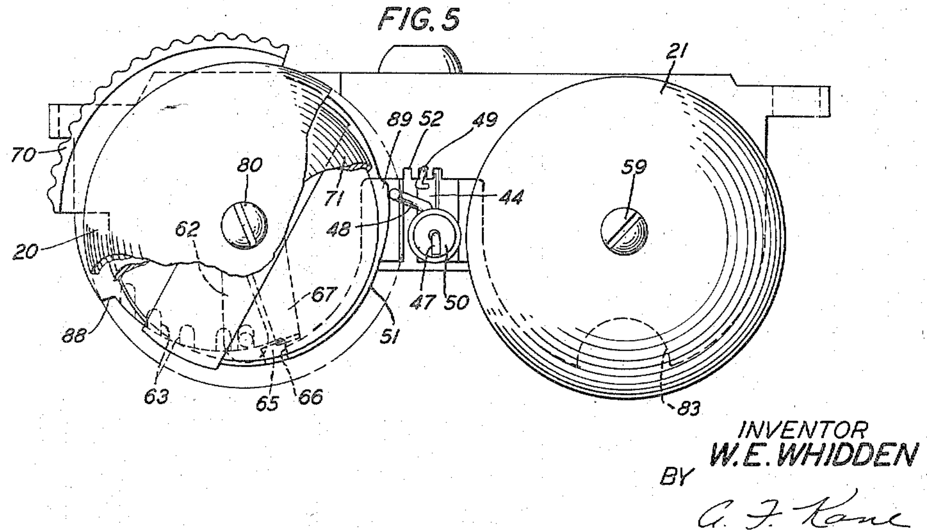

Reference will now be made to Figs. 3, 4 and 5. In Fig. 3 the ringer is set for maximum sound. It will be observed that at this setting the spacing between the gongs 20 and 21 is a maximum as is also the distance of the outer end of the stop rod 48 from the edge of the gong mounting 51.

In Fig. 4 the sector 70 has been rotated in a counterclockwise direction through a predetermined arc. As a result of this movement the gong mounting 51 has been similarly rotated carrying the gong 20 closer to the gong 21. Also, because of the peripheral contour of the mounting the distance from the edge of the mounting 51 to the stop rod 48 has been diminished so that the permissible armature stroke has been decreased. This results in a sound signal of lower intensity.

In Fig. 5 the detent component 67 has been pulled outward to clear the stop 66 and the gong mounting has been further rotated in a counterclockwise direction to the limit of its range in that direction. In this position the projecting lug 65 abuts the projecting edge 66 of the frame section 13 which projecting edge serves as a stop. It will be noted that in this position of the gong mounting 51 the camming node 89 on the edge thereof is in contact with the stop rod 48 so that the ringer armature 44 is effectively blocked against movement and the ringer is precluded from emitting any sound signal.

It has been hereinbefore mentioned that each resonator 56 and 71 is provided with two diametrically disposed substantially semicircular openings 4 (Fig. 6) and that, with the ringer adjusted for maximum sound (Fig. 3) these resonator openings and the clapper ball 50 are in alignment so that the clapper strikes the gong portions which are located immediately in front of the resonator openings. The resonator openings do not appear in Figs. 3, 4 and 5. To show them would complicate the drawings unnecessarily. As the gong mounting 51 is moved counter-clockwise the clapper ball 50 strikes the gongs at points well displaced from the resonator openings so that for each setting of the regulator from the maximum sound output setting the resonators operate at decreased efficiency.

What is claimed is:

1. The combination in a telephone ringer of a rotable gong mounting, a gong, a resonator having an opening therein, a clapper for striking said gong having a normal position, means for mounting said gong and said resonator in fixed spaced relation on said gong mounting, and means for effecting the rotation of said gong mounting relative to the normal position of said clapper whereby the location of the opening in said resonator relative to the normal position of said clapper varies as said gong mounting is rotated.

2. In a telephone ringer the combination of a frame, an armature, a stop rod fixed at one end to said armtaure, an adjustable stop for said rod comprising a rotatable eccentric mounted on said frame with its peripheral edge disposed opposite the free end of said rod, a gong, means for mounting said gong on said eccentric and means by which said eccentric may be rotated.

3. In a telephone ringer the combination of a frame, an armature, a stop rod fixed at one end to said armature, means cooperating with said stop rod for regulating the stroke of said armature comprising an eccentric rotatably mounted on said frame with its peripheral edge disposed opposite the free end of said stop rod, a gong post carried by said eccentric, a gong supported by said post, and a striker fixed to said armature.

4. In a telephone ringer the combination of a frame, an armature, a stop rod fixed at one end to said armature, means cooperating with said stop rod for regulating the stroke of said armature comprising an eccentric rotatably mounted on said frame with its edge spaced opposite the free end of said stop rod, a gong post formed integrally with said eccentric with its longitudinal axis displaced from the axis of rotation of said eccentric, and a gong supported on said post.

5. In a telephone ringer the combination of a frame, an armature, a stop rod fixed at one end to said armature, means cooperating with said stop rod for regulating the stroke of said armature comprising an eccentric rotatably mounted on said frame with its edge disposed opposite the free end of said stop rod, a gong post associated with said eccentric and having its longitudinal axis displaced with respect to the axis of rotation of said eccentric, a resonator having a pair of diametrically disposed resonator openings therein fixed to said post for rotation with said eccentric, and a gong mounted on said post in telescopic relation to said resonator.

6. In a telephone ringer the combination of a frame, a stationary gong mounted on said frame, an armature, a stop rod fixed at one end to said armature, a second gong, and means for adjusting the stroke of said armature and for simultaneously adjusting the spacing between said gongs comprising an eccentric mounted for rotation on said frame with its peripheral edge disposed opposite the free end of said stop rod, and a mounting post for said second gong fixed to said eccentric at a point displaced from the axis of rotation thereof.

7. In a telephone ringer the combination set forth in claim 6 in which a clapper rod is staked at one end to said armature and supports a clapper intermediate said gongs.

8. In a telephone ringer the combination of a pair of gongs, a vibratiable armature, a clapper rod fixed at one end to said armature and supporting a clapper ball between said gongs, and means for regulating the stroke of said armature to thereby regulate the sound output of said ringer comprising a stop rod fixed to said armature and an eccentric stop mounted on said ringer for rotation relative to said stop rod to vary the spacing of the edge thereof from said stop rod, said eccentric having a peripheral node which, when said eccentric is rotated through a predetermined arc abuts said stop rod and prevents vibration of said armature.

WILLIAM E. WHIDDEN.

REFERENCES CITED

The following references are of record in the file of this patent:

UNITED STATES PATENTS

| Number | Name | Date |
|---|---|---|
| 444,600 | Patterson | Jan. 13, 1891 |
| 1,744,375 | Feder | Jan. 21, 1930 |
| 2,217,073 | Obergfell | Oct. 8, 1940 |
| 2,273,688 | Boolz et al. | Feb. 17, 1942 |
| 2,468,474 | Whidden | Apr. 26, 1949 |